United States Patent [19]

Knipe

[11] 3,964,243

[45] June 22, 1976

[54] ROTARY MOWER BLADE WITH DETACHABLE TINES

[75] Inventor: Earl Albert Knipe, Warsaw, Ill.

[73] Assignee: Rexnord Inc., Milwaukee, Wis.

[22] Filed: Mar. 10, 1975

[21] Appl. No.: 556,576

[52] U.S. Cl. .................................. 56/17.5; 56/295
[51] Int. Cl.² ......................................... A01D 43/02
[58] Field of Search ................ 56/17.5, 16.9, 295, 56/400; 172/42

[56] References Cited
UNITED STATES PATENTS

| | | | |
|---|---|---|---|
| 2,720,071 | 10/1955 | Watanabe | 56/295 X |
| 2,869,311 | 1/1959 | Beeston, Jr. | 56/295 |
| 3,117,633 | 1/1964 | Hosek | 56/295 X |
| 3,753,338 | 8/1973 | Sherratt | 56/295 X |

*Primary Examiner*—Louis G. Mancene
*Assistant Examiner*—J. N. Eskovitz

[57] ABSTRACT

The outer section of a rotary mower blade is stamped with a U-shaped cut-out portion to define a tab extending in the direction of the center of the blade. Each tine device is formed of springwire and includes a downward end section which forms the tine and a coiled section which is mounted on the tab. The other end section overlies the mower blade to prevent rotation of the entire device on the tab by the operation of the tine which is to loosen the thatch formed by accumulated grass clippings.

10 Claims, 6 Drawing Figures

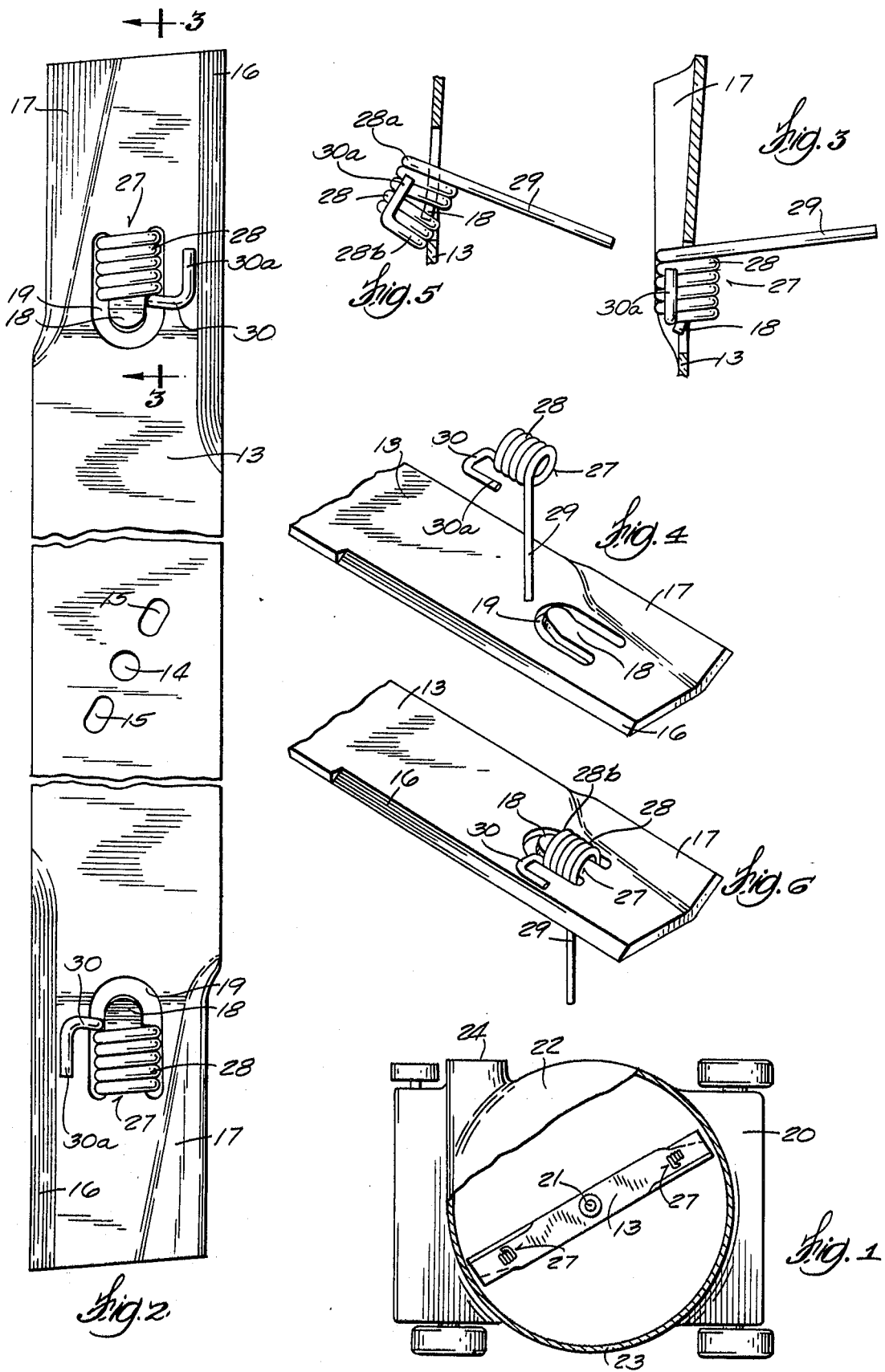

ROTARY MOWER BLADE WITH DETACHABLE TINES

BACKGROUND OF THE INVENTION

Rotary lawn mower blades are power driven at relatively high speeds. The smaller blades which are used in pairs are each in the order of 11 inches (28 cm.) in length or diameter. The larger blades are in the order of 30 inches (76 cm.) in length. Tines for attachment to rotary mower blades have been proposed but appear to be too insecurely attached or are too readily detached from the whirling blades.

One type of powered rotary lawn mower has a housing with a scroll which is well designed for the tangential discharge of the grass clippings alongside the mower. The blades for such mowers may include upturned vanes which extend along the rear edges of the blade and serve to blow the grass clippings from the mower path. An object of the present invention is to provide tine devices which attach securely to the blade near its ends and forwardly of such vanes.

SUMMARY OF THE INVENTION

A tine device of spring-wire includes a coiled section by which it is mounted on the tab of a rotary mower blade. The tab projects radially inward having reference to the rotation of the blade and the body of the blade fully surrounds the tab and the coiled section so that the tine device is safely held in place without other means but is readily removed when not required.

BRIEF DESCRIPTION OF THE DRAWINGS

FIG. 1 shows in plan the base and wheels of a rotary mower. The upper portion of the mower is sectionally removed to show the blade in plan.

FIG. 2 is an enlarged top view of the blade shown in FIG. 1.

FIG. 3 is a section taken on line 3—3 of FIG. 2.

FIG. 4 is a perspective view of one end of the blade with the device positioned for attachment to the blade.

FIG. 5 is a section of the blade similar to that of FIG. 3 and shows the manipulation of the device which is required for its attachment to or removal from the blade.

FIG. 6 is a perspective view similar to FIG. 4 showing the device attached to the blade.

DETAILED DESCRIPTION OF THE PREFERRED EMBODIMENT

The lawn mower blade 13 shown in FIGS. 2–6 is of typical size and is formed from a flat mild-carbon steel bar or alloy steel strip 2¼ inches (5.7 cm.) in width and 22 inches (56 cm.) in length. A central hole 14 and mounting holes 15 are provided, and the rotational leading edges of the outer sections of the blades are beveled as at 16 to provide the cutting edges of the blade. In the style of blade shown, the trailing portions of the outer sections of the blade are turned upwardly to form the vanes 17. Vanes 17 provide a flow of air which improves the grass cutting function of the blade as is well known.

According to the present invention, each end section of blade 13 further includes the tab 18 on which the tine device is to be attached. Each tab is formed in the manufacture of the blade, before heat-treating, by striking out a portion of the outer section of the blade to provide a U-shaped cut-out area or slot 19 which then defines a mounting tab 18. The tab 18 as shown is located generally as near the tip of blade 13 as is practicable and so that the tab extends from its distal end toward the center of the blade. It is important also that slot 19 is located between the leading and trailing edges of the blade so that the body of the blade entirely surrounds the tab.

FIG. 1 shows the lower part of the frame 20 of a typical powered rotary lawn mower which includes blade 13. The lower end of the drive shaft of the motor or engine, not shown, carries blade 13 and preferably extends through hole 14 of the blade. Various means of securing the blade to the shaft may be provided. As shown, blade 13 is conveniently bolted to the hub 21 through the holes 15 in the blade. The engine or motor which is carried by the frame 20 is supported directly on the deck 22, shown in part. The space in which blade 13 operates is enclosed by deck 22 and the circular rim or skirt 23 of frame 20 extends downward to a prescribed distance below the blade. A sideward discharge opening may be provided as at 24 for the tangential discharge of the grass clippings to one side of the mower.

For safety, the lower rim of housing 23 must be some distance below the blade, and for the proper air flow, which has been mentioned, deck 22 must be some optimum short distance above the blade. Thus, the space above the blade 13 is limited, and a particular feature of the present invention resides in the fact that attaching the tines to the blade may be accomplished without removal of the blade from the mower, as will be described in detail hereinafter.

Each tine device 27 shown in FIGS. 2–6 consists of a length of springwire which includes the coils 28, the tine 29 and the tang 30. The coils 28 form a helix, and the tine 29 extends tangentially from the coil 28a (FIG. 5) at one end of the helix. The tang 30 extends outwardly from the coil 28b (FIGS. 5 and 6) at the other end of the helix and includes the end section 30a (FIGS. 2, 4 and 5) which extends parallel to and alongside the helix.

A device 27 is assembled on a tab 18 by inserting an extending tine 29 through slot 19 and directing the coils 28 angularly downwardly toward the end of tab 18. As shown, the end of tab 18 is upturned slightly and is rounded so that the lower portion of the endmost coil 28a can reach under the tab as shown in FIG. 5. This is its critical position or required orientation for assembly or disassembly of the device on the blade. That is, slot 19 particularly is not enlarged opposite the free end of tab 18 such that for example coils 28 may be easily lined-up with the tab and slipped endwise onto the tab. Such ease of assembly would mean that the device is too likely to be displaced in the operation of the mower and present a great hazard to the operator and anyone near by. Thus, the slot 19 is only as large as is absolutely necessary for assembly and it is considered important also that a slight interference fit be provided such that the helix formed by coils 28 must be flexed slightly in order to allow them to move further into the slot and into position on the tab. This interference fit is shown in FIG. 5. The axis of coil 28a and the several adjacent coils is angular with respect to that of the several other coils and the coil 28b.

With a device 27 in place on each end of the blade, the tines 29 then project downwardly. Tines 29 should, of course, reach downwardly only so far as is necessary so that they will loosen the accumulated grass clippings which have formed a thatch. However, as the mower traverses very uneven parts of the lawn, the coil 28*b* and the adjoining coils may wind and unwind slightly on tab 18 so that the lower ends of the tines may if necessary follow the contours of the lawn.

The tine devices 27 are, of course, most easily assembled on blade 13 when the blade is removed from the mower. However, unless the blade is to be removed anyway as for sharpening, it is preferable that the devices be attached to the blade without removing the blade from the mower. Such a choice is made possible by the reliable attachment which the present invention uniquely provides. That is, (being sure first to disable the engine) a person may invert the mower and with a device in hand reach between blade 13 and deck 22, and insert tine 29 upwardly through slot 19 and snap the coil over tab 18. Removal of the device in the reverse manner is also readily allowed without having to remove blade 13 from the mower.

It should be understood that flexing of the coils 28 as shown in FIG. 5 in the attachment of each coil onto tab 18 must require some effort for two reasons. Safety considerations require complete assurance that the device cannot be dislodged under any circumstances and notwithstanding the fact, of course, that centrifugal force tends to hold coils 28 on the tab. The second reason is that the effectiveness of tine 29 requires a considerable stiffness in coils 28 so that they hold the tine in its downward position with adequate force. Without such stiffness the tines would merely drag through the grass without effect. In the operation of the mower, the coils hold the tines in their downward position but allow the tines to pivot upwardly and rotationally rearwardly generally on the axis of tab 18 with rotation of coils 28*a* and the adjoining coils. The tang 30 which engages the upper side of blade 13 prevents rotation of the coil 28*b* at the other end of the helix so that the resilience of the coils is effective to return the tine to its downward position. The end section 30*a* of tang 30 extends toward the radially outer end of blade 13 so that grass clippings, string and the like are unlikely to be caught by the tang. Also, as tine 29 pivots on tab 18 and while section 30*a* prevents rotation of coil 28*b*, the entire group of coils 28 tends to rock upward on section 30*a* and the coils are more free to flex in slot 19. That is, if tang 30 only extends radially of coil 28*b*, the movement of tine 29 upwardly and rearwardly tends to lift coil 28*b* and to skew the group of coils relative to tab 18 so that the coils are less free to wind and unwind on the tab. The upturned end of tab 18 and the extended section 30*a* of the tang virtually also prevent any other assembly or misassembly of the device 27 on blade 13.

The tab 18 is surrounded by the blade 13 so that it is unlikely to be bent in case the coil strikes a firm obstruction, which would most often be a partially exposed rock. In such a case, the displacement of the coil could otherwise bend or break off the tab which would then with the entire device be propelled outwardly from under the mower.

The loose attachment of thatcher devices to a rotating mower blade is always properly the cause of great concern. It is believed that the present invention is uniquely safe.

It is thought to be a near certainty as well that each device 27 fits a tab 18 and can enter slot 19 in only one proper position as shown and described. Misassembly which might lead to personal injury is thus virtually impossible insofar as is known. By way of explanation, some confusion in assembly might be occasioned by the fact that the mower must be inverted for access and to attach the device without removing the blade. On the other hand, if the blade is removed, its upper and lower sides are distinguishable without doubt, but some confusion in sharpening the edges, is known to have occurred on occasion.

In the operation of the lawn mower shown in FIG. 1 with blade 13 having vanes 17 and the tine devices 27 attached thereto, the tines 29 effectively loosen the thatch, and the air flow within the housing 23 generated by vanes 17 lifts the loosened grass into the path of the blade 13 where it is further cut for disposal or further and accelerated disintegration.

The foregoing is a description only of the preferred embodiment of the invention as presently contemplated by the inventor. The claims which follow particularly point out and distinctly claim the subject matter which is regarded as the invention.

I claim:
1. The combination for use with a powered rotary lawn mower comprising:
    1. a horizontal flat bar having sharpened end sections and central means for its mounting on the lower end of the vertical drive shaft of the mower, each said end section having a U-shaped cut-out area defining a radially inward-extending tab surrounded by the bar, at least a substantial portion of said tabs lying in the planes of the adjacent portions of said bar, and
    2. two tine devices, each device being formed of spring wire and consisting of a series of coils, a tang extending laterally from the first coil and a tine extending downwardly from the last coil, said coils of each device being removably mounted on one of said tabs with the tine projecting downwardly therefrom, each said tine being disposed to be pivotally displaced upwardly and rearwardly respecting rotation of the blade, each said tang engaging the bar and preventing rotation of the device on the tab in one direction, whereby the several coils function as a spring to return the tine to its downward position following such displacement.

2. The combination of claim 1 wherein the outer end portion of the tang of each device extends radially outward respecting the blade.

3. The combination of claim 1 wherein the axis of the coils is normally straight and each slot and coils are dimensioned such that the series of coils must be flexed to allow their movement onto and from the tab whereby the secure attachment of each device to the blade is provided.

4. The combination of claim 1 wherein the radial outer sections of the blade further include upturned trailing edges adapted to cause the air to lift the loosened grass for further cutting by the sharpened leading edges.

5. The combination of claim 1 wherein the radially inward end of said tabs are bent slightly upward out of the planes of the adjacent portions of said bar.

6. The combination of a powered rotary lawn mower blade and two detachable tine devices,
    said blade comprising a horizontal flat bar having
    1. end sections, each end section having
        a. a forward sharpened cutting edge,
        b. a rearward upturned air-vane, c. a U-shaped cut-out area intermediate said cutting edge and air-vane and defining a tab having its distal end integral with the bar and its other end extending toward said mounting means, and 2. a central section having mounting means for mounting the blade on the lower end of the drive shaft of the mower; each of said tine devices comprising a length of springwire including:

a. a coiled central section mounted on said tab and including first and second end coils, b. a straight section extending downwardly from the first coil and forming a tine, and c. a laterally projecting section extending from the second coil and overlying the blade and forming a tang which prevents rotation of the device on said tab, the resilience of said coils being such as to allow the tine to be pivotally displaced upwardly and rearwardly beneath the air-vane and to return the tine to its downward position.

7. The combination of claim 6 wherein the cut-out area is of such size that detachment of the device from the mower be endwise movement of the coils from the distal end of the tab is prevented except by deflecting the coils upwardly and over the blade.

8. The combination of claim 7 wherein at least a substantial portion of said tabs lie in the planes of the adjacent portions of said bar.

9. The combination of claim 8 wherein the radially inward ends of said tabs are bent slightly upward out of the planes of the adjacent portions of said bar.

10. The combination of claim 7 wherein the radially inward ends of said tabs are bent slightly upward out of the planes of the adjacent portions of said bar.

* * * * *